UNITED STATES PATENT OFFICE.

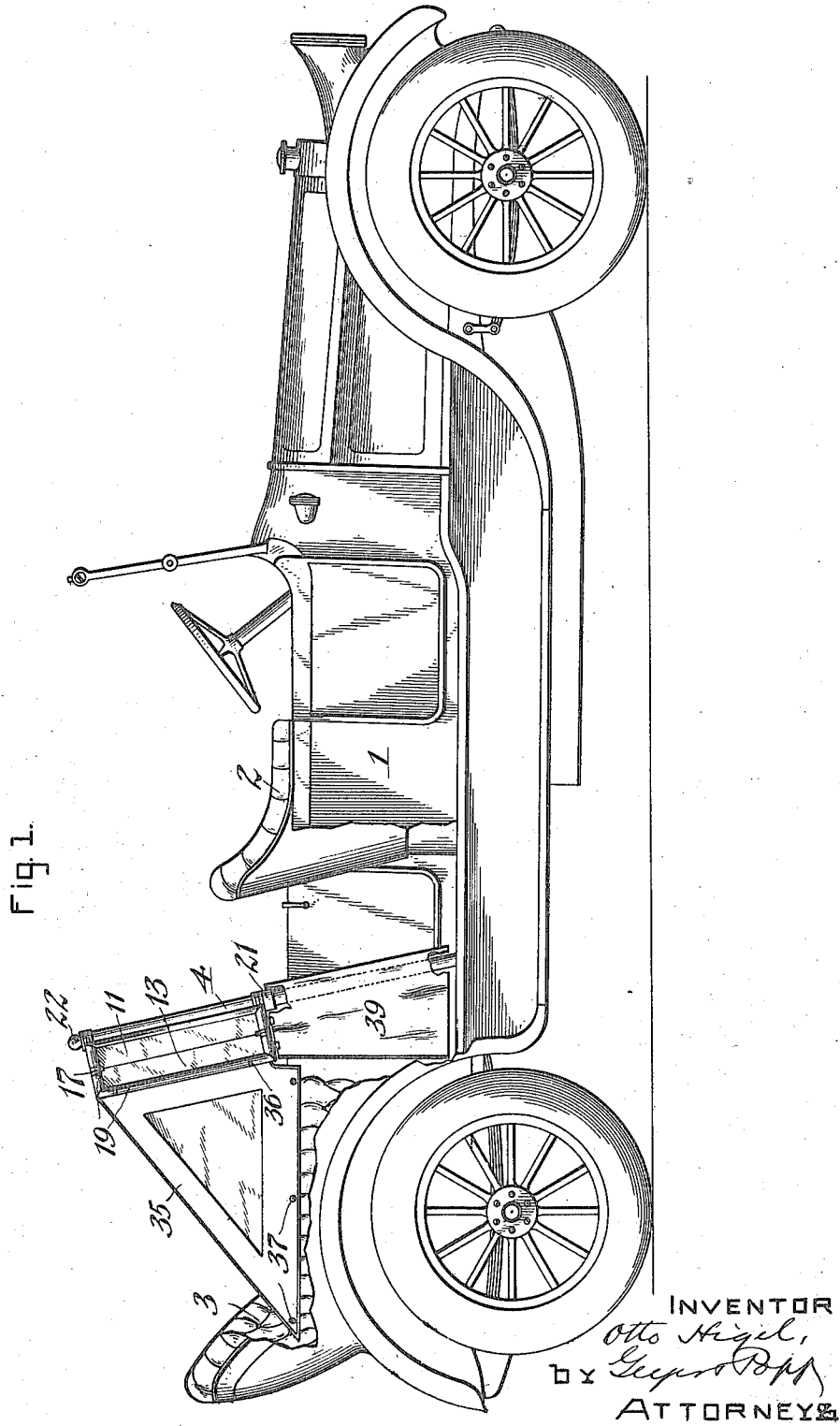

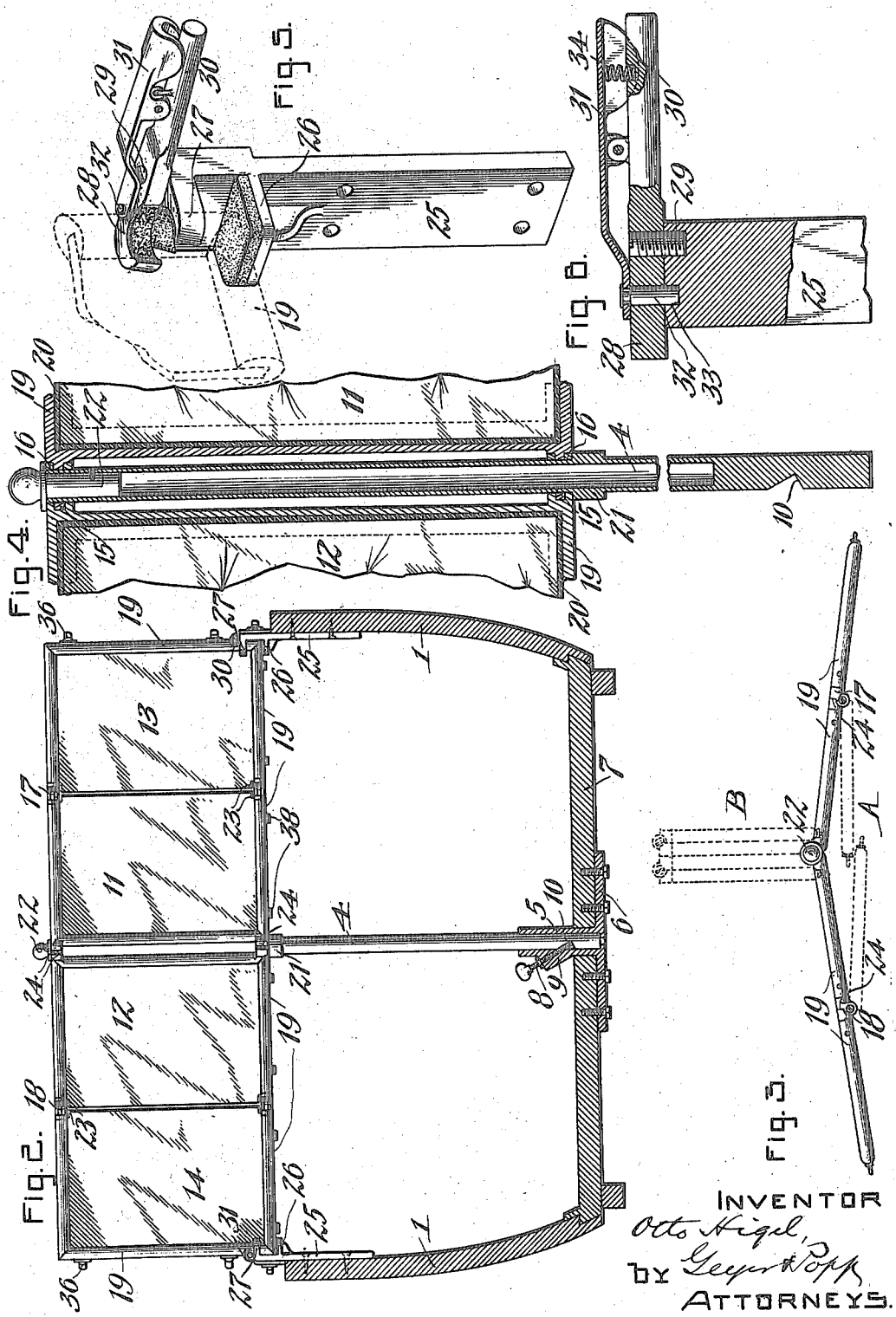

OTTO HIGEL, OF TORONTO, ONTARIO, CANADA.

WIND-SHIELD.

1,249,397.  Specification of Letters Patent.  Patented Dec. 11, 1917.

Application filed August 7, 1915. Serial No. 44,162.

*To all whom it may concern:*

Be it known that I, OTTO HIGEL, a subject of the King of Great Britain, residing in the city of Toronto, in the Province of Ontario, in the Dominion of Canada, have invented new and useful Improvements in Wind-Shields, of which the following is a specification.

This invention relates to a wind shield for automobiles designed more particularly for the rear seat of the car, although the shield may also be advantageously used on motor boats and other vehicles.

The object of the invention is the production of a shield of this character which can be readily applied to and removed from an automobile, which while presenting a sightly appearance is firmly supported and which can be manufactured at comparatively low cost.

Another object is to so construct the shield that when not in use it can be collapsed or folded out of the way to leave ample room for the entrance and exit of passengers.

In the accompanying drawings:

Figure 1 is a side elevation of an automobile equipped with the improvement, the body being partly broken away to better show the wind shield. Fig. 2 is a transverse vertical section of the automobile-body looking toward the front, showing the means for securing the shield in place. Fig. 3 is a top plan view of the shield. Fig. 4 is a longitudinal section of the supporting post, on an enlarged scale, showing the means of hinging the leaves of the shield thereto. Fig. 5 is a perspective view of one of the clamps for holding the free ends of the shield in place. Fig. 6 is a vertical section of said clamp and its locking catch.

Similar characters of reference indicate corresponding parts throughout the several views.

1 indicates the body of the automobile provided with the usual front seat 2 and rear seat 3.

In the example shown in the drawings, the improved shield is arranged to protect the occupants of the rear seat. Located centrally in front of this seat is a supporting post or upright 4 which is preferably removably seated in a socket or tubular standard 5 rising from the floor of the car. In the construction shown, this socket is mounted on a base plate 6 secured to the underside of a cross beam 7 of the frame-structure. The post 4 may be confined in its socket by any suitable means, the device illustrated in the drawings, Fig. 2, consisting of an inclined bolt 8 arranged in a boss 9 of the socket and interlocking with a notch 10 in the post.

The wind shield is mounted on the upper portion of the post 4 and comprises a suitable number of folding leaves or sections which, when unfolded, are adapted to extend from side to side of the automobile body, and when folded, permit passengers to enter or leave the car conveniently. In its preferred construction the shield consists of four hinged leaves, two inner leaves 11, 12 and two outer ones 13, 14. The inner leaves are pivoted to the post 4 preferably by hinge eyes or knuckles 15, 16, at the inner ends of said leaves, while the outer leaves are likewise hinged to the free ends of the inner leaves, as shown at 17, 18. The customary glass panes of the shield may be held in the frames 19 of the leaves by any suitable means, and are cushioned by linings 20 of rubber or other appropriate material. The inner leaves 11, 12 are supported upon a collar or shoulder 21 of the post 4, and confined to the latter by a flanged pin or plug 22 secured within the upper end of the post. To allow the leaves to fold together, the corners of the panes adjacent to the hinge joints are cut away, as shown at 23. The inner leaves are preferably constructed to fold forward only, and the outer leaves to fold rearward only, the hinges having suitable stops 24 for this purpose, similar to those of rule-joints.

To prevent the unfolded outer shield-leaves from swinging backwardly under the pressure of the wind, they are detachably secured at both sides of the car by suitable clamps or fastenings. The preferred fastening devices shown in the drawings consist of upright supports or plates 25 secured to the inner side of the body or the inner side of the doors of the automobile and each having a rest or ledge 26 for the lower corner of the adjacent outer shield-leaf and a pair of clamping jaws 27, 28 arranged above said ledge and adapted to embrace the frame of said leaf. The jaw 27 of each pair is stationary while the other 28 is movable and pivoted to the top of the support by a pin or screw 29. The movable jaw 28 is provided with a handle or lever 30 on the upper side of which is fulcrumed a locking lever or spring-catch 31. The inner end of this lever carries a pin 32 adapted to engage a socket 33 in the head of the support 25. The outer portion of the lever is preferably shaped to form a suitable housing for its spring 34.

The gripping faces of both jaws, as well as the rest may be lined with leather or rubber to prevent rattling and marring of the frame of the shield.

As shown in Fig. 1, the post 4 preferably has a slight rearward inclination or rake, so that the wind will not strike the shield squarely but will be deflected upwardly, thereby reducing the strain on the shield. For the same purpose the two hinged portions or halves of the shield on opposite sides of the post are preferably arranged to converge forward slightly, as shown in Fig. 3.

Attached to the outer ends of the shield are side curtains 35 preferably of triangular form which prevent wind from entering behind the shield. These curtains are detachably secured to the frame of the shield by any ordinary or suitable fasteners 36, and to the inner sides of the automobile by suitable clasps or fasteners 37. The bottom rails of the wind shield may be provided with a series of staples 38 to receive the fastening straps of a detachable apron 39, which protects the occupants of the rear seat from dust and wind, especially when the front seats of the automobile are divided or separated, as in the more recent models.

This wind shield, being constructed of hinged leaves or sections, can be folded into a small compass. For this purpose, the outer free ends of the shield are released from their holding clamps, by depressing the rear ends of the locking catches 31 and opening the movable jaws of said clamps. The outer leaves are then folded rearwardly and inwardly to the position indicated by the dotted lines A in Fig. 3, after which either or both of these folded halves of the shield may be folded forwardly to the position indicated by the dotted lines B in said figure. In the last mentioned position, there is ample room for the occupants of the rear seat to leave the car. In cars having individual or separated front seats, either half of the shield may be folded forwardly to the dotted position B, to allow either of the occupants of the rear seat to pass out between the front seats.

If it is desired to remove the wind shield from the automobile, the leaves are folded together and the clamping bolt 8 moved out of engagement with the notch 10, permitting the post to be withdrawn from its socket.

By mounting the shield principally upon a substantially upright post which rests upon the floor of the automobile-body, the shield is firmly supported, avoiding the liability of unduly straining its support and loosening or breaking the same under the vertical vibrations of the car, which is liable to occur when the shield is carried by an overhanging arm or bracket.

It is obvious that this shield can be constructed of any desired or suitable number of sections, and that its construction may be modified within the scope of the appended claims without departing from the spirit of the invention.

I claim as my invention:

1. The combination of an automobile, a post removably arranged in front of a seat thereof, a foldable wind shield comprising sections hinged to opposite sides of said post, and bracket-plates mounted at opposite sides of the automobile-body, each of said plates carrying a ledge arranged to support the outer end of the adjacent shield-section, and fixed and movable clamping jaws arranged to engage said section.

2. The combination of an automobile, a post removably arranged in front of a seat thereof, a foldable wind-shield comprising sections hinged to opposite sides of said post, and bracket-plates mounted at opposite sides of the automobile-body, each of said plates carrying a ledge arranged to support the outer end of the adjacent shield-section, and coöperating fixed and movable jaws arranged above said ledge and adapted to engage said sections, each of said movable jaws having a locking catch.

OTTO HIGEL.

Witnesses:
H. M. CHRISTMAN,
ENDFRED LUNDBERG.